Aug. 18, 1936.  J. G. JONES ET AL  2,051,216
METHOD FOR ELECTRICALLY WELDING ALL METAL SPOOLS
Filed July 1, 1935
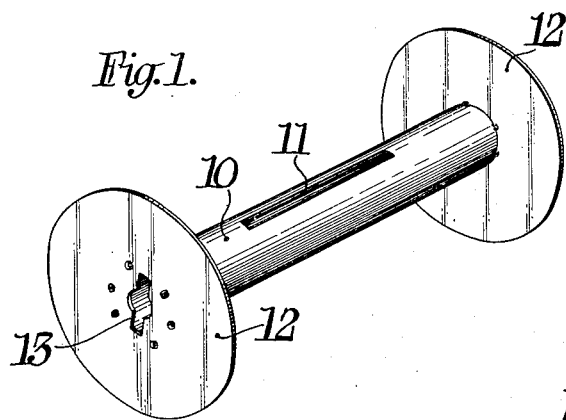
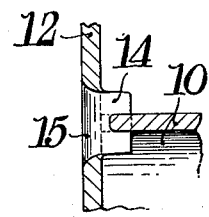
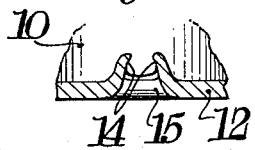
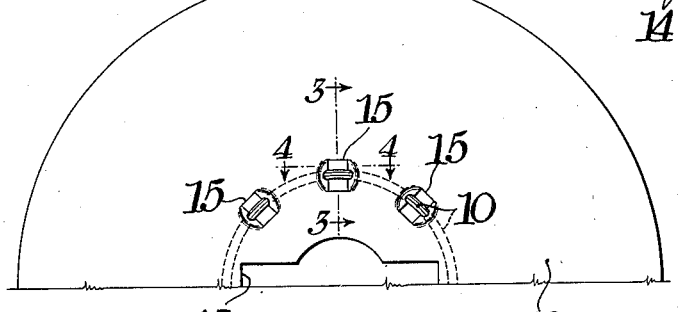
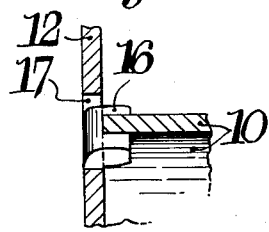
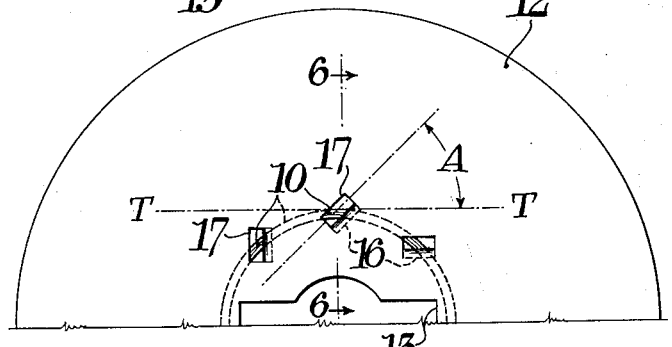
INVENTORS:
John G. Jones & Haywood G. Dewey,
BY
ATTORNEYS.

Patented Aug. 18, 1936

2,051,216

UNITED STATES PATENT OFFICE 2,051,216

METHOD FOR ELECTRICALLY WELDING ALL METAL SPOOLS

John G. Jones and Haywood G. Dewey, Rochester, N. Y., assignors to Eastman Kodak Company, Rochester, N. Y., a corporation of New York Application July 1, 1935, Serial No. 29,232

14 Claims. (Cl. 219—10)

The present invention relates to a method for making all-metal spools and, more particularly, to a method in which projections are provided on the flanges to facilitate the formation of the weld.

The provision of a plurality of projections upon members to be welded is well known to the prior art. One instance of the employment of such projections in the manufacture of metal spools by welding is disclosed in Jones patent, 1,754,205, issued April 8, 1930. According to said Jones patent, a plurality of cup-shaped projections of definite wall thicknesses are formed in each flange. A high degree of precision is required in the tools and forming operation to provide such projections which abut against the ends of the hollow core. Upon welding the metal constituting said projections becomes molten and is welded to the metal of the core, but the projection itself practically disappears at the completion of the welding operation.

The primary object of the present invention is the provision of a method for uniting a core and flange to form a spool and in which incising projections are provided on the flange to cut into the core during welding for increasing the tensile and torsional resistance of the welded connection.

Another object of the invention is the provision of a method for joining a flange and a core and which includes the provision of incising projections on the flange, said projections extending in angular relation to the tangent of said core at the joint so as to be incised into the core upon welding.

A further object of the invention is the provision in the flange by a comparatively crude and inexpensive punching operation of a plurality of incising projections and at the same time perforating the flange to provide, at the welded joints, openings through which the excess lacquer may be drained from the spools after finishing.

Still another object of the invention is the provision of a method for uniting a core and flange which includes punching a pair of incising projections from the flange, said projections being inclined toward each other so that the metal of the core, after welding, forms a dovetail connection therewith.

Other and further objects of the invention will be suggested to those skilled in the art by the following description.

The above and other objects of the invention are inherent in a method of joining a flange to a core which includes the provision of incising projections upon the flange. Such incising projections must be capable of cutting into the metal of the core during welding for good intermixture of the molten metal of the two members. Suitable incising projections may be provided or formed on said flanges in any desired manner, but it is preferred to punch holes in the flanges and at the same time to throw out a pair of projections which are inclined toward each other and which are somewhat thinner at their ends. Said pair of projections will be incised into the core and the metal of the core will fill the space between the inclined projections to form a dovetail connection between the flange and the core.

The welded joint thus formed according to this invention has greater tensile and torsional resistance and such improved results are obtained without increasing the cost of producing or preparing the spool parts but rather by employing less exacting and less expensive formation of the projections on the flanges.

Reference is hereby made to the accompanying drawing wherein similar reference characters designate similar elements and wherein:

Fig. 1 is a perspective of a finished spool which has been welded according to the method of the present invention;

Fig. 2 is a partial end view to enlarged scale of the finished spool;

Fig. 3 is a fragmentary section through the joint between the flange and the core of the spool and is taken on the line 3—3 of Fig. 2;

Fig. 4 is also a fragmentary section through the joint between the core and flange, but is taken on the line 4—4 of Fig. 2;

Fig. 5 is a partial end view of a welded spool in which the incising projection has a modified form;

Fig. 6 is a fragmentary section through the modified joint and is taken on the line 6—6 of Fig. 5.

The method of our invention is illustrated as applied to the manufacture of photographic film spools. Such a spool comprises a core 10 provided with a slot 11 and preferably formed according to the disclosure of Chamberlain U. S. Patent 1,648,539, issued November 8, 1927. The core 10 is made from a sheet metal. The flanges 12 are preferably of circular outline, are provided centrally with a key slot 13, and are also made from a sheet metal preferably of the same gauge or thickness as the sheet metal from which the core 10 is formed.

A plurality of incising projections are provided on the flanges 12 and are arranged so as to abut the ends of the wall of core 10 when the core 10 and flanges 12 are assembled in relative coaxial relation. In order that these projections will have the necessary incising action, they must extend transversely of the wall of core 10 in said assembled position so that the projections may cut into the metal of core 10 during welding. A necessary condition of said projections is that they must be in angular relation to a tangent to the core at the joint when the flange and core are in said relative coaxial relation. The degree of angular relation may vary from a radial location of the projection or an angle of 90° to the tangent of the core at the joint to an angle which approaches, but never attains parallelism with the tangent to the core at the joint. The projections which are radially provided, or which make large angles with the tangent are preferred because such projections have a maximum incising action. On the other hand, the projections which make small angles with the tangent provide greater areas of contact with the core but do so at the expense of the incising action.

The preferred form of the incising projections is illustrated in Figs. 2-4 inclusive. A punching tool is driven through flange 12 and by cooperation with a suitable die throws out a pair of incising projections 14 and at the same time provides in the flange an opening 15 which is greater in axial extent than the thickness of the wall of core 10. The projections 14 are preferably punched so that they are inclined toward each other, see Fig. 4, and so that they are thinner at their ends.

The projections 14 are not exactly at the radius of flange 12, but make the necessary acute angle with the tangent to the core at the joint and are very near to the radius of said flange 12. This position of the projection 14 is defined in the appended claims as being "along a radius of said flange." Such terminology is deemed to define the projections as provided according to Figs. 2-4 inclusive and similar projections provided directly on radii of the flange 12.

Preliminary to the actual welding operation, the core 10 and a pair of flanges 12 are placed in relative coaxial relation with the projections 14 of the flanges 12 extending across the end walls of core 10. A welding current is passed through the projections 14 and the core 10, or through the flanges 12, projections 14 and core 10 to raise the temperature of the metal in these members to the welding point. At the same time an axial pressure is exerted in a well known manner on the flanges 12 so that said flanges 12 are moved toward core 10. This axial movement of the flanges 12 with respect to core 10 causes the projections 14 to cut into the metal of core 10, which is now sufficiently fluid to fill the tapered space between projections 14, as shown in Fig. 4. Of course, the metal intermixes and the original source of the metal in the joints can no longer be determined, but undoubtedly the incising action has promoted this intermixture of the metals and has improved the tensile strength of the welded joints for that reason.

The openings 15 are greater in axial extent than the thickness of the wall of core 10, see Fig. 2. The core 10 is welded to flange 12 so that the end of the core extends across the openings 15. The end of core 10 is preferably centered in the openings 15 as illustrated in Fig. 2. As a result the finished spool is provided with openings on each side of core 10. These openings 15 permit the drainage of surplus lacquer from the spool, especially during the centrifuging operation on the lacquered spools. Therefore, the punching operation through the flange 12 not only provides incising projections for improvement of the welded joint, but may also be readily adapted to provide drainage openings in the completed spool to facilitate subsequent finishing operations, such as lacquering.

Referring now to Figs. 5 and 6, the incising projections 16 may be punched from the flange 12 and leave an opening 17. The projections 16 make the angle A with the tangent to the core at the joint, which tangent is represented by the dot-dash line T—T. Projections 16 also have the incising action according to the invention, while openings 17 are also greater in axial extent in the wall of core 10 so that the finished spool has drainage openings on each side of the core 10.

The incising projections of our invention may be provided in many different ways, in many different forms and in many different locations. Therefore, the scope of our invention is not to be limited by the illustrated embodiments thereof, but rather only by the appended claims.

Having now particularly described our invention what we desire to secure by Letters Patent of the United States and what we claim is:

1. The method of uniting a core and a flange having an incising projection extending transversely of said flange and extending across the end of said core when said flange and core are in coaxial relation, which comprises assembling said core and flange in coaxial relation with said projection abutting the end of said core and extending transversely thereof, passing a welding current through said core and said projection, and simultaneously pressing said core and said flange toward each other so that said projection is incised and welded into said core.

2. The method of uniting a hollow core composed of sheet material and a flange having an incising projection extending transversely of said flange, which comprises assembling said core and flange in coaxial relationship with said projection abutting and extending transversely across the end of said core, passing a welding current through said core and said projection, and simultaneously pressing said core and said flange coaxially toward each other whereby said projection cuts into and is welded to said core and the end of said core abuts the surface of said flange.

3. The method of uniting a cylindrical core and a flange, which comprises forming an incising projection extending transversely of said flange and located in angular relation to the tangent of said core when said flange and core are in relative coaxial relation, pressing said core and said flange toward each other with said incising projection abutting the end of the core in said angular relation, and passing a welding current through said core and said projection so that said projection is incised into said core and welded thereto.

4. The method of uniting a cylindrical core and a flange having an incising projection extending transversely of said flange and located in angular relation to the tangent of said core when said flange and core are in relative coaxial relation, which comprises assembling said core and flange with said incising projection abutting the end of the core in said angular relation, passing a welding current through said core and said projection, and simultaneously pressing said core and flange toward each other to incise said projection into said core and to move the end of said core into abutment with the surface of said flange.

5. The method of uniting a cylindrical core and a circular flange, which comprises forming an incising projection extending along a radius of said flange and in angular relation to the tangent of said core when said flange and core are in relative coaxial relation, pressing said core and flange toward each other with said incising projection abutting the end of the core in said angular relation, and passing a welding current through said core and said projection so that said projection is incised into said core and welded thereto.

6. The method of uniting a hollow cylindrical core which is formed from sheet metal, and a flange substantially equal in thickness to the sheet metal of said core, which comprises punching through said flange to form an incising projection which extends from the surface of said flange and extends in angular relation to the tangent of said core at the joint when said core and flange are in relative coaxial relation, passing a welding current through said core and said projection, and simultaneously moving said core and said flange toward each other to incise said projection into said core and weld said projection to said core.

7. The method of uniting a hollow cylindrical core which is formed of sheet metal, and a flange substantially equal in thickness to the sheet metal of said core, which comprises punching through said flange to form an incising projection which is adapted to abut one end of said core in angular relation to the tangent of said core at the joint when said core and flange are in relative coaxial relation and which projection is reduced in cross section at the end by said punching operation, passing a welding current through said core and said projection, and simultaneously moving said core and said flange toward each other to incise said projection into said core and weld said projection to said core.

8. The method of making a spool by joining together a flange and a core formed from sheet metal, which comprises punching through said core to form an incising projection which is adapted to abut the end of said core in angular relation to the tangent of said core at the joint when said core and flange are in relative coaxial relation, said punching operation providing in said flange an opening which is greater in radial extent than the thickness of the wall of said core, and incising said projection into said core by electric welding with the end of the metal of said core extending across said opening without closing the same.

9. The method of making a spool by joining together a flange and a core formed from sheet metal, which comprises punching through said flange to form an incising projection which is adapted to abut the end of said core in angular relation to the tangent of said core at the joint when said core and flange are in relative coaxial relation, said punching operation providing in said flange an opening which is greater in radial extent than the thickness of the wall of said core, passing a welding current through said projection and said core, and moving said core and flange coaxially toward each other with the wall of said core opposite the central portion of said opening to incise said projection into said core and to weld said core to said flange with the wall of said core extending across the center of said opening to leave openings on each side of said core wall.

10. The method of uniting a hollow core and a flange, both composed of sheet metal, which comprises punching through said flange to form a pair of incising projections which extend from the surface of said flange and which are located and arranged to abut the end of said core in angular relation to the tangent of said core at the joint when said flange and core are in coaxial relation, pressing said core and flange coaxially toward each other with said projections abutting the end of said core in said angular relation thereto, and passing a welding current through said projections and said core whereby said projections are incised into said core and welded thereto.

11. The method of uniting a hollow core and a flange, both composed of sheet metal, which comprises punching through said flange to form a pair of incising projections which extend from the surface of said flange, which are located and arranged to abut the end of said core in angular relation to the tangent of said core at the joint, and which are inclined toward each other, pressing said flange and core coaxially toward each other with said projections abutting the end of said core in said angular relation thereto, and passing a welding current through said projections and said core whereby said projections are incised and welded into said core and the adjacent metal of the core enters the tapered space between said projections to form a dove-tail connection therewith.

12. The method of making a spool by joining together a circular flange and a hollow cylindrical core, both composed of sheet metal of approximately the same thickness, which comprises punching through said flange to form a pair of incising projections which extend along a radius of said flange to abut the end of said core in angular relation to the tangent of said core at the joint when said flange and said core are in relative coaxial relation and which projections are thinned at the end and inclined toward each other, said punching operation providing in said flange an opening which is greater in radial extent than the thickness of the wall of said core, passing a welding current through said core and said pair of projections, and simultaneously moving said core and said flange toward each other with a portion of the wall of said core opposite the central portion of said opening, to incise said projections into said core, the metal of said core entering the tapered space between said projections to form a dove-tail connection therewith and extending across the center of said opening to leave openings on each side of the core wall.

13. As an article of manufacture, a flange for attachment by welding to a hollow core and having a plurality of incising projections which are located to abut the ends of said core and to form an angle with the tangent to said core at the joint when said flange and core are in assembled relation.

14. As an article of manufacture, a flange for attachment by welding to a hollow core and having a plurality of incising projections which are located in pairs to abut the ends of said core and to form an angle with the tangent to said core at the joint when said flange and core are assembled, said projections of each pair being inclined with respect to each other.

JOHN G. JONES.
HAYWOOD G. DEWEY.